United States Patent [19]

Hayasaki et al.

[11] Patent Number: 4,953,015

[45] Date of Patent: Aug. 28, 1990

[54] METHOD FOR PRINTING A COLOR IMAGE WHICH INCLUDES BLACK INK

[75] Inventors: Hideto Hayasaki, Nara; Masaki Takakura, Higashiosaka; Yasukuni Yamane; Noritoshi Kako, both of Nara, all of Japan

[73] Assignee: Sharp Kabushiki Kaisha, Osaka, Japan

[21] Appl. No.: 283,856

[22] Filed: Dec. 13, 1988

[30] Foreign Application Priority Data

Dec. 14, 1987 [JP] Japan .................................. 62-318206
Feb. 12, 1988 [JP] Japan .................................. 63-31532
Jun. 23, 1988 [JP] Japan .................................. 63-157534
Jun. 23, 1988 [JP] Japan .................................. 63-157535

[51] Int. Cl.$^5$ ............................................. H04N 1/46
[52] U.S. Cl. ......................................... 358/79; 358/75
[58] Field of Search ................... 358/75, 75 IJ, 78, 79, 358/80

[56] References Cited

U.S. PATENT DOCUMENTS 4,595,948 6/1986 Itoh et al. ........................ 358/75 IJ

FOREIGN PATENT DOCUMENTS 59-163974 9/1984 Japan ..................................... 358/80
60-182864 9/1985 Japan ..................................... 358/75

Primary Examiner—James J. Groody
Assistant Examiner—Randall S. Svihla

[57] ABSTRACT

In color printing, for example, a color image is generally picked up by a color camera, image scanner and is processed by an image processor and a processing result is obtained as a full color image by a color printer. Some color printers use three different color inks of yellow, magenta and cyan and other printers use black in addition to those inks. Black ink is outputted to print a black area of the colored image and allotment of yellow, magenta or cyan inks is formed on at least part of the black area. Allotment and output of each of the color inks onto the black ink is determined by a color matrix table which defines a color ink output rule. The color matrix table also contains matrix elements for not outputting any of the color of inks. The black ink is output in accordance with a dither matrix table which is an array of thresholds defining where to form the black ink dots in the black area of the color image dependently of the color density levels of colors in the colored image so that the double output of the black ink and the level magenta or cyan inks determined by the color matrix is carried out in accordance with the color density levels of the colors in the colored image. In addition the colored inks can be applied onto the black ink dots not only in a color matrix table but also by the use of random numbers, that is by random selection of the colored inks.

11 Claims, 10 Drawing Sheets

Fig. 1

SUBTRACTIVE COLOR MIXTURE

Y : Yellow
M : Magenta
C : Cyan
Bk : Black
R : Red
G : Green
B : Blue

Fig. 2(a)

|   | 1 | 2 | 3 |
|---|---|---|---|
| 1 | Y | M | C |
| 2 | C | Y | M |
| 3 | M | C | Y |

Fig. 2(b)

|   | 1 | 2 | 3 |
|---|---|---|---|
| 1 | Y | M | C |
| 2 | Y | M | C |
| 3 | Y | M | C |

Fig. 2(c)

|   | 1 | 2 | 3 |
|---|---|---|---|
| 1 | Y | Y | Y |
| 2 | M | M | M |
| 3 | C | C | C |

Fig. 2(d)

|   | 1 | 2 | 3 | 4 |
|---|---|---|---|---|
| 1 | O | M | O | M |
| 2 | C | Y | C | Y |
| 3 | M | O | M | O |
| 4 | Y | C | Y | C |

Fig. 3

Color Mixture Pattern

| O0 | C8 | M2 | Y10 |
|---|---|---|---|
| M12 | Y4 | O14 | C6 |
| C3 | O11 | Y1 | M9 |
| Y15 | M7 | C13 | O5 |

Fig. 17(b)

| M0 | Y8 | O2 | C10 |
|---|---|---|---|
| O12 | C4 | M14 | Y6 |
| Y3 | M11 | C1 | O9 |
| C15 | O7 | Y13 | M5 |

Fig. 17(c)

| C0 | O8 | Y2 | M10 |
|---|---|---|---|
| Y12 | M4 | C14 | O6 |
| O3 | C11 | M1 | Y9 |
| M15 | Y7 | O13 | C5 |

Fig. 17(d)

| Y0 | M8 | C2 | O10 |
|---|---|---|---|
| C12 | O4 | Y14 | M6 |
| M3 | Y11 | O1 | C9 |
| O15 | C7 | M13 | Y5 |

Fig. 19

| O0 |    |    |    |
|---|---|---|---|
|    |    | M2 |    |
|    | Y1 |    |    |
|    | C3 |    |    |

⇑

| O0 |    |    |    |
|---|---|---|---|
|    |    | M2 | C6 |
|    | Y4 | Y1 |    |
|    | C3 | M7 | O5 |

⇑

| O0 | C8 | M2 | Y10 |
|---|---|---|---|
|    | Y4 |    | C6 |
|    | C3 | O11 Y1 | M9 |
|    |    | M7 | O5 |

⇑

| O0 | C8 | M2 | Y10 |
|---|---|---|---|
| M12 | Y4 | O14 | C6 |
| C3 | O11 | Y1 | M9 |
| Y15 | M7 | C13 | O5 |

(High) (Light) ←——— Color Density in R-G-B System ———→ (Low) (Dark)

Dither Matrix
(Bayer Type)

| 0  | 8  | 2  | 10 |
|----|----|----|----|
| 12 | 4  | 14 | 6  |
| 3  | 11 | 1  | 9  |
| 15 | 7  | 13 | 5  |

METHOD FOR PRINTING A COLOR IMAGE WHICH INCLUDES BLACK INK

BACKGROUND OF THE INVENTION

The present invention relates to color printing method used for color-printing a full-colored image. The image is picked up by an image pickup device such as a color camera, image scanner, or the like. Thereafter the image is processed in an image processor. In a preferred embodiment the invention is directed to a color printing method which makes it possible to output a high contrast and good quality image from an output device, such as a color inkjet printer, heat transfer color printer of a melting type, or the like.

Figure 21:
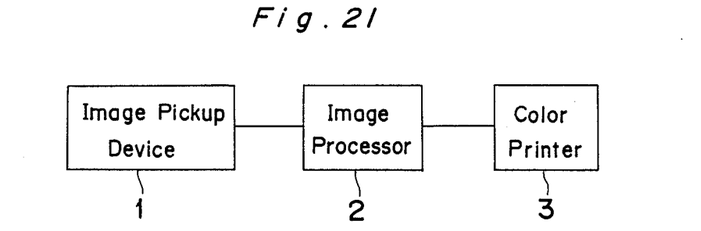
FIG. 21 shows a block diagram of a printing system generally used.

In general color printing, as shown in FIG. 21, uses a full-colored image picked up by a pickup device 1 such as a color camera, image scanner, or the like which is processed by an image processor 2 and a processing result obtained is outputted as a full-colored image by a color printer 3. Some color printers use three different color inks of yellow, magenta and cyan, and other color printers use black ink in addition to those inks. It cannot be said, however, that color of each of such inks has an ideal spectral distribution, because of the following limitations derived from printers' properties.

(1) In the case of the color inkjet printer, it is necessary to use inks of low viscosity in order to avoid clogging of the ink heads, and to select to ink materials that permeate printing paper to an appropriate depth of the paper and to form ink dots of a proper diameter.

(2) In the case of the heat transfer color printer of ink melting type, because inks are heated by a printing head of a very small area and transferred onto printing paper, it is necessary to select ink materials which has the necessary melting points, response times, adhesivity to printing paper, etc.

Because of such limitations, it often happens that when a natural image having several thousands of gradated colors, i.e., a full-colored image, is printed, an output image has black with a low density. The low density of the black deteriorates contrast and quality of the image printed.

Color printers that output inks onto printing paper dot by dot can be classified as follows:

(a) Ink density for each dot is changeable.
(b) Ink density for each dot is fixed (to binary digit 0 or 1).

Figure 22:
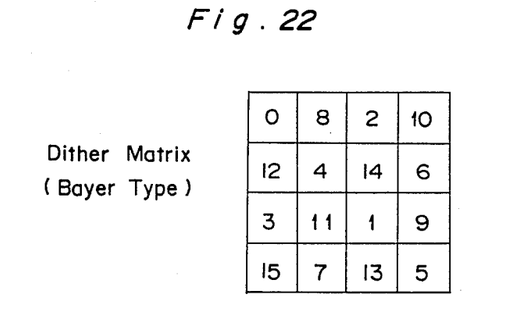
FIG. 22 shows a dither matrix table of Bayer type.

In the case of outputting a full-colored image using a color printer adopting the principle (b) above, a displaying method based on a pseudo-half tone represented by a dither matrix system is adopted. This method expresses density information of each of picture elements composing an image using density of dots per unit area. FIG. 22 shows a dither matrix of Bayer type by way of example. This matrix table is composed of 4 rows by 4 columns and is designed so that ink dots are dispersed as much as possible. Color density of an ink color for one picture element has sixteen levels (0–15). Numerals 0–15 shown in FIG. 22 are thresholds to decide the arrangement of ink dots to be printed out. Value of image information is compared with the threshold, and the ink dot is printed out or not according to a result of the comparison.

Figure 23:
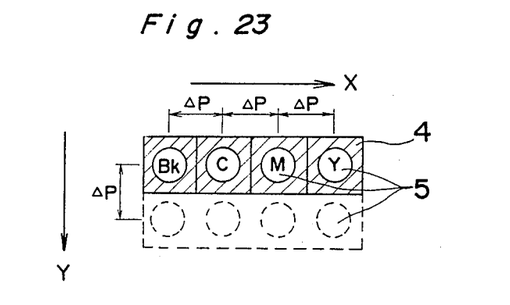
FIG. 23 shows ink heads for outputting yellow, magenta, cyan and black inks provided in a color printer.

Generally, a printer head of a printer using four different color inks has ink heads 4 for outputting yellow, magenta, cyan and black inks aligned in a lateral or longitudinal direction, as shown in FIG. 23. These ink heads 4 are moved in the directions X and Y relatively to printing paper. A pitch of ink dots is equal to a minimum moving pitch ΔP of the ink heads 4 in the directions X and Y. Accordingly, double-output of inks of different colors at a common position is possible, but a double-output of the same ink is impossible.

In order to overcome the problem of the low density of black ink, there is a method in which, using the printer head to output the black, yellow, magenta and cyan inks, all the inks are outputted at the same place. This method, however, if applied to a color inkjet printer, causes the printer head to output ink of a quantity beyond the water absorptive power of a printing paper, which causes formation of dots of an unacceptable diameter, blur, contact of the ink outputted and the printer head causing stains on the paper.

There is a further method in which black ink and either one of yellow, magenta and cyan inks are outputted at the same place. This method seeks avoiding blurring and staining on printing paper. But, if black ink is always combined with yellow ink, for example, an output image will have a yellowish hue. On the other hand, in combination with cyan ink, the image will have a light bluish hue, and with magenta ink, the image will be purplish.

According to a still further method, yellow, magenta and cyan inks are outputted on black ink dots in turns in order to avoid the problem of a printout image having a hue of a specified color. This method has a problem, however, that in some cases cyclic outputting of yellow, magenta, and cyan inks causes stripes on an output or printout image, deteriorating quality of the image to a great extent.

SUMMARY OF THE INVENTION

A primary object of this invention is to provide color printing method which makes it possible to obtain black of high density in a printout image without damaging colors of the image nor the image itself, so that the output image has good contrast and is of a good quality.

In order to accomplish the object, the color printing method of the present invention includes the steps of outputting black ink to print a black area of the colored image, and allotting and outputting color inks other than the black ink onto ink dots formed of the black ink in at least part of the black area so that ink dots of each of the color inks and the black ink dots in the at least part of the black area are placed one upon another.

By the use of the color inks to make black dots with the black ink, a deep black of a printed image is obtained, making the image of good contrast.

The allotment and output of each of the color inks onto the black ink dots is determined by a color matrix table defining a rule of color ink allotment. Alternatively, it may be determined based on random numbers, that is a random selection of the inks.

Preferably, the color matrix table defines the allotment of the color inks so that the respective color inks occur at similar probabilities in the at least part of the black area. With such a color matrix table, black of the printed image will not have any specific hue, and no stripes having a hue of a specific color do not show in the black area. Therefore, a good quality image can be obtained.

Preferably, the color matrix table contains matrix elements for not outputting any of the color inks. This can moderate color density of black if it is too high.

The black ink is outputted in accordance with a dither matrix table defining output of the black ink to make the black ink dots. This dither matrix table is composed of an array of thresholds for defining where to form the black ink dots in the black area of the colored image dependently on color density levels of colors in the colored image so that double output of the black ink and the color inks determined by the color matrix is carried out in accordance with the color density levels of the colors in the colored image.

The color matrix table may define the allotment of the color inks to the black ink dots in such a manner that, of the color inks, a specified color ink is allotted more than the other color inks to a portion of the black area where the black ink dots occur at a high occurrence probability according to the dither matrix table, whereby the specified color ink is outputted more than the other color inks in the black area of the colored image. By the use of this color matrix table in combination with the dither matrix table, a desired hue such as bluish, reddish, or greenish hue can be given to black of the printed image, because the specific color ink outputted more than the other color inks in the portion where the black dots occur at a high occurrence probability. On the other hand, where black should be either deep or light, it does not occur that the specified color ink is outputted much, compared with the other color inks.

Furthermore, the color matrix table may define the rule of color ink allotment in such a manner that matrix elements of the color matrix table have one-to-one correspondence to all dots to be made on printing paper.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

FIGS. 2(a), 2(b), 2(c) and 2(d) which are directed to a first embodiment of the invention, show color matrix patterns, by way of examples, used to mix yellow, magenta or cyan ink with black ink to make a color density of black higher so as to obtain a contrast color image without having a hue of a specified color.

Figure 3:
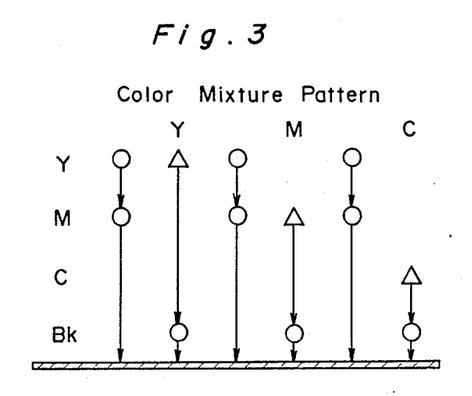
FIG. 3 shows a way of mixing black and other color inks in the event that black and red are printed alternately.

Each of the color matrix patterns 2(a), 2(b) and 2(c) has an arrangement of three rows by three columns by which yellow, magenta or cyan ink is mixed with black ink and the mixed color is printed on every dot in a black region of an image. For example, as shown in FIG. 3, in the case of printing black and red alternately using the color matrix pattern 2(a), mixture of yellow and cyan inks is printed on dots to represent red, and mixture of black ink and either of yellow, magenta and cyan inks on dots to represent black. As a result, color density of black becomes higher and an image obtained has good contrast. A triangle symbol in the figure represents ink to be mixed with black ink.

Figure 1:
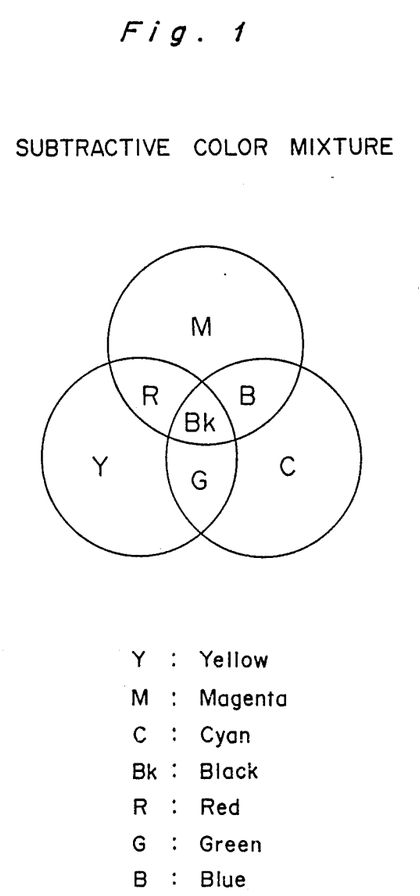
FIG. 1 is an explanatory view of the subtractive color mixture.
Figure 2A:
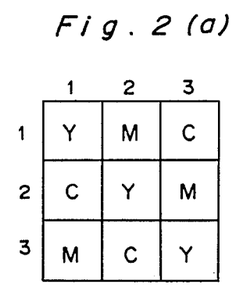
FIGS. 2(a), 2(b), 2(c) and 2(d) each show a color matrix table used in a first embodiment of the present invention.
Figure 2B:
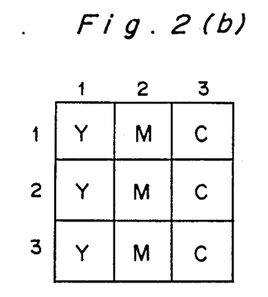
Figure 2C:
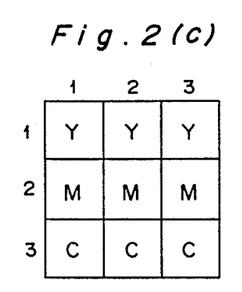
Figure 2D:
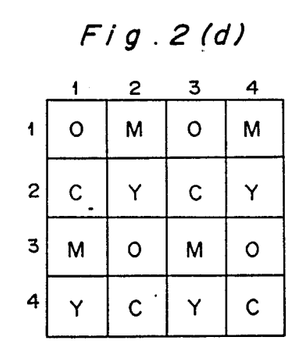
Figure 4:
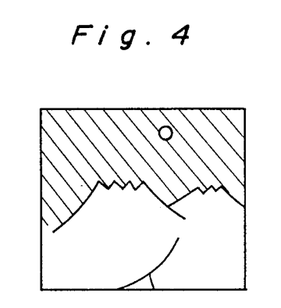
FIG. 4 shows a night scene to which the matrix of FIG. 2(d) is applied.
Figure 5:
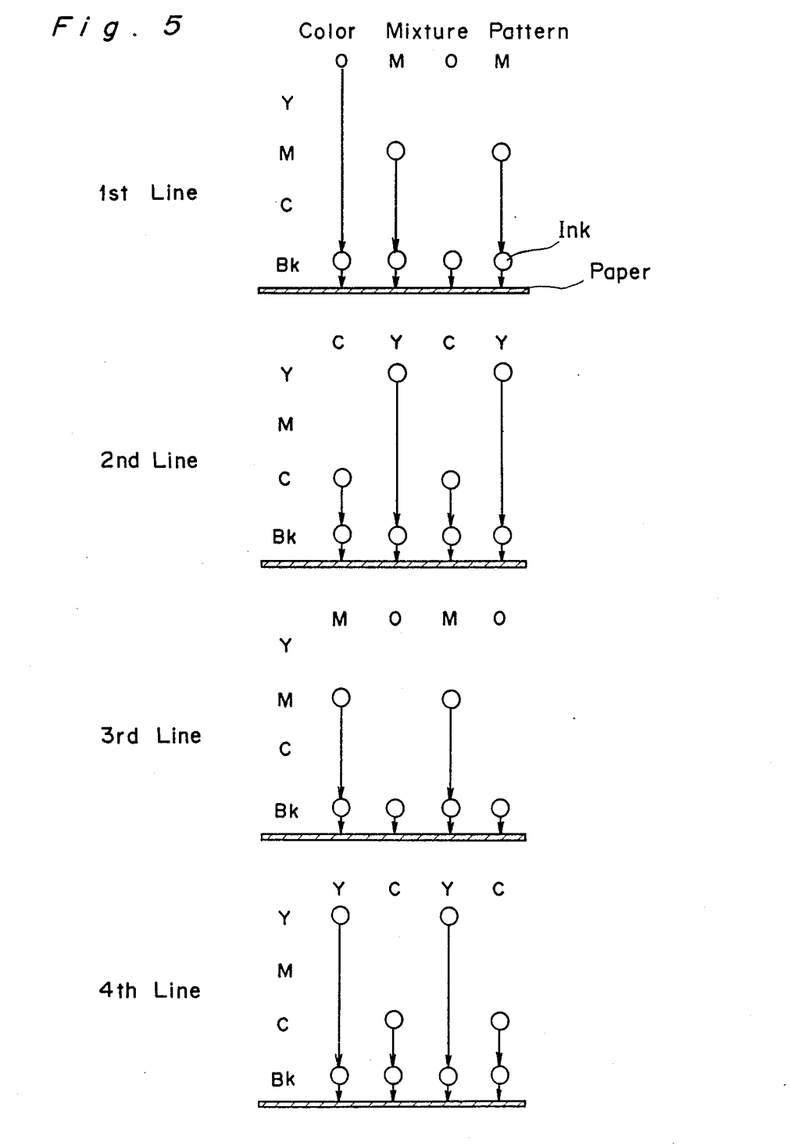
FIG. 5 shows a way of mixing black and other color inks in accordance with the color matrix of FIG. 2(d)

It can be considered that application of the matrix pattern 2(a), 2(b) or 2(c) to an extended black region would cause stripes having a hue of a specified color running laterally, longitudinally or diagonally. In this case, another pattern 2(d) is used. A case that the pattern 2(d) is applied to a hatched portion of a full-colored mountain scene shown in FIG. 4 will be considered hereinafter. This scene is a night scene and the hatched portion must be colored black. Red, blue and green are used in other portions than the hatched one. In such regions, mixture of two different inks makes each dot, and therefore, density of colors in such areas is naturally high. In order to make the hatched portion match the other portions in color density, printing is carried out using the pattern 2(d). In this pattern 2(d), as shown in FIG. 5, "O" indicates printing in only black (Bk), and "Y", "M" and "C" indicate printing using mixture of black ink and yellow, magenta and cyan inks, respectively. This color mixture is carried out for each dot from a first line through a fourth line. As a result of the color mixture in accordance with the pattern 2(d), the hatched portion contains the following four different ink combinations: Bk, Bk+Y, Bk+M, and Bk+C. When the black area has a high dot density, the area appears to one's eyes very dark due to an effect of the subtractive color mixture shown in FIG. 1, and therefore, the image will have good contrast.

According to this embodiment, as known from the above, a black area of an image, after printed, is effectively emphasized because of the mixture of black ink and yellow, magenta or cyan ink based on such color matrix patterns as shown in FIG. 2 in which matrix elements representing yellow, magenta and cyan are arranged so as not to cause black to have a hue of a specified color.

In this embodiment, inks are mixed according to the color matrix patterns. But, ink to be mixed with black ink may be determined using random numbers.

In a second embodiment of the invention, a table of "m" rows by "n" to output other color inks than black ink on black ink dots, and black ink and other color inks are outputted based on the table so that a contrast output image of a good quality having black of high density is obtained.

Figure 6:
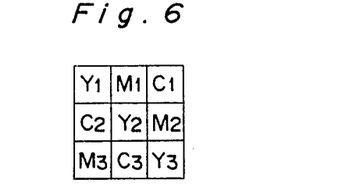
FIG. 6 shows a color matrix table used in a second embodiment of the present invention.

FIG. 6 shows a color matrix table specialized for black color information by way of example. In this color matrix where m=3 and n=3, the first row begins with Y1, and M1 and C1 follow Y1 in that order. The second row begins with C2 and then, Y2 and M2 follow in that order. The third row begins with M3, followed by C3 and Y3. Yi (i=1-3) indicates double-output of black and yellow inks, Mi (i=1-3) double-output of black and magenta inks, and Ci (i=1-3) double-output of black and cyan inks. The term "double-output" here means output of two different inks at the same position (this term is always used in this sense in this specification and the claims.) As understood easily from the figure, Y1, Y2 and Y3 in the first, second and third rows are located in different columns, and so are M1, M2 and M3, and C1, C2 and C3. Therefore, a black area of a printed image will not have a yellowish or purplish or light bluish hue, and no stripes of a specified color appear therein.

In many of such systems as shown in FIG. 21, output image signal from the image processor 2 is composed of data of three primary colors of red (R), green (G) and blue (B). In this case, black is expressed by R=G=B=0 according to the additive color mixture theory. And, when a full-colored image is printed using yellow, magenta, cyan and black inks in response to output signals indicative of the image from the image processor 2, color density of each of colors is expressed by a density of ink dots per unit area through a processing done using a dither matrix table, for example, as aforementioned relative to the prior arts.

Figure 7A:
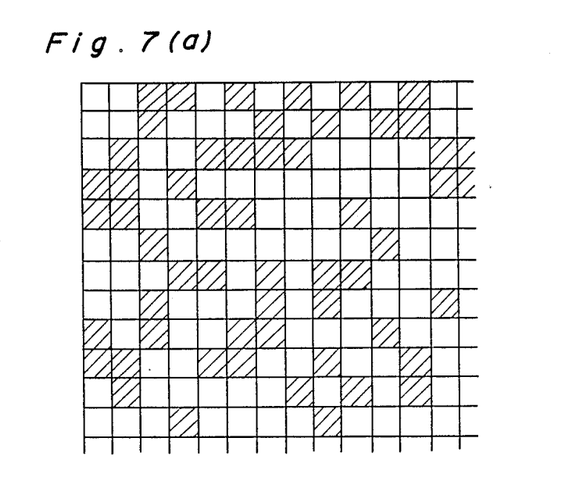
FIG. 7(a) shows an example of black dot arrangement.

Assume that such dither processing in response to input image signals results in a distribution of black ink dots as shown in FIG. 7(a), where hatched portions represent black ink dots. When the color matrix table specialized for black color information shown in FIG. 6 is applied to the image, yellow, magenta and cyan inks are individually combined with black ink at the hatched portions, as shown in FIG. 7(b).

Figure 7B:
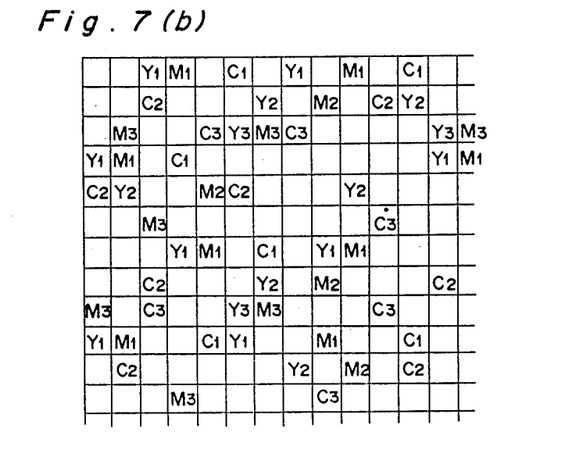
FIG. 7(b) shows a result of applying the color matrix table of FIG. 6 to the black dot arrangement of FIG. 7(a)

In the first line or row of FIG. 7(b), yellow ink Y1 is outputted on a black ink dot first, and then, magenta ink M1 and cyan ink C1 follow yellow ink Y1 in that order. Thereafter, yellow ink Y1 is outputted on a black ink dot again. That is, in the first line of printing, Y1, M1 and C1 are outputted to be mixed with black ink in that order. In the second line, mixture with black ink begins with cyan ink C2, and this cyan ink C2 and the other inks Y2 and M2 are individually outputted on respective black ink dots in that order. In the third line, magenta ink M3 is put on a black ink dot first, and is followed by cyan and yellow inks C3 and Y3. That is, M3, C3 and Y3 are put on respective black ink dots repeatedly in that order. Thus, printing for the (3n+1)st line (n=1,2, . . .) is carried out similarly to that for the first line; printing for the (3n+2)nd line similarly to that for the second line; and printing for the (3n+3)rd line similarly to that for the third line.

Because black ink dots are dispersed due to the dither processing and output of the three color inks other than black ink occurs at equal probabilities in both directions X and Y, a printout image does not have a hue of a specified color at a black area thereof. In addition, even though black ink dots are distributed cyclically, no stripes are seen, because Y1, Y2 and Y3 in the first, second and third rows are located in different columns, and so are M1, M2 and M3, and C1, C2 and C3, so that colors such as yellow, magenta and cyan are blended.

Figure 8:
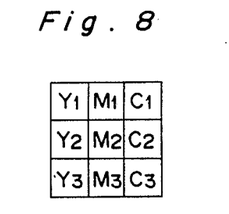
FIG. 8 shows a color matrix table where only yellow belongs to a first column, only magenta to a second column, and only cyan to a third column.
Figures 9A, 9B, 9C:
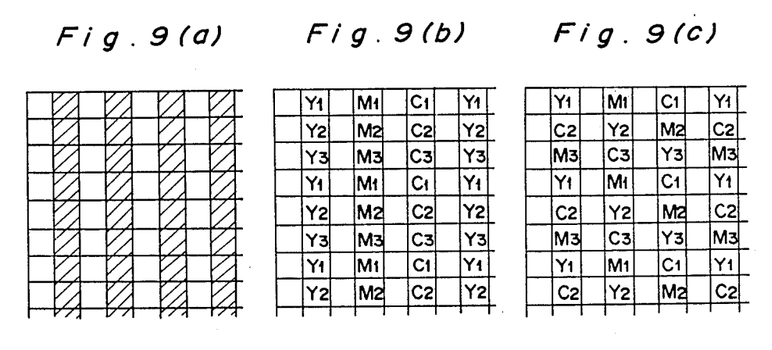
FIG. 9(a) shows a cyclic output of black ink dots.
FIG. 9(b) shows a result of applying the color matrix table of FIG. 8 to the cyclic black ink dot pattern of FIG. 9(a)
FIG. 9(c) shows a result of applying the cclor matrix table of FIG. 6 to the cyclic black ink dot pattern of FIG. 9(a)

When black ink dots are distributed cyclically as shown in FIG. 9(a) and a color matrix specialized for black information is defined as shown in FIG. 8, a double-output dot pattern formed after printing is as shown in FIG. 9(b). As easily understood from the figure, one column contains only black-yellow ink dots, another column only black-magenta ink dots, and a still another column only black-cyan ink dots, and therefore, stripes having a tinge of yellow, magenta or cyan appear in a black area of a printed image, and this deteriorates quality of the image.

On the other hand, the color matrix of FIG. 6 causes a double-dot pattern as shown in FIG. 9(c). In this case, output of yellow, magenta and cyan inks is not cyclic, and black appears to one's eyes very deep.

Figure 10A:
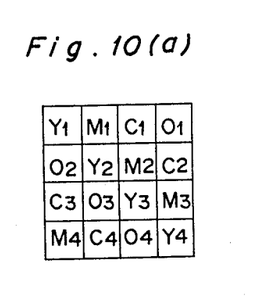
FIGS. 10(a) and 10(b) show further color matrix tables according to the second embodiment.
Figure 10B:
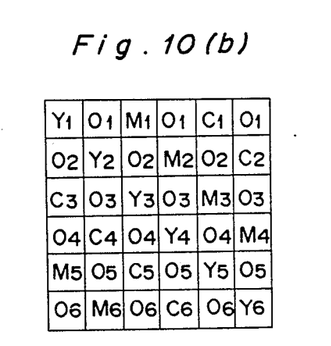

FIG. 10 shows other color matrix tables specialized for black color information. Of the color matrix tables, one shown in FIG. 10(a) is composed of four rows by four columns and the other shown in FIG. 10(b) is composed of six by six. In FIGS. 10(a) and 10(b), On (n=1,2,3,4,5,6) indicates a portion for forming only a black ink dot. The reason why these elements On are contained in the color matrix tables is to regulate color density of black. That is, if the color matrix of FIG. 6, for example, generate too deep black, then, the matrix as shown in FIG. 10(a) or 10(b) may be used to moderate the color density of black.

Occurrence probabilities of double-output of black ink and another color ink are almost equal with respect to yellow, magenta and cyan inks, so that black does not have a yellowish or purplish or bluish hue and no stripe having such a hue appears. In addition, presence of only black ink dots prevents color density of black from being excessively high and makes an output or printout image proper contrast.

Preferably, the color matrices shown in FIG. 6 and FIG. 10 are used properly in accordance with properties of printing inks used. An optimum color density of black can be obtained by the combination use of different color matrix tables.

Figure 11A:
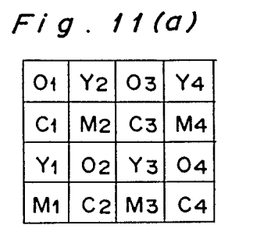
FIGS. 11(a), 11(b) and 11(c) each show a color matrix table used in a third embodiment of the present invention.
Figure 11B:
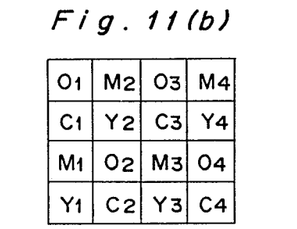
Figure 11C:
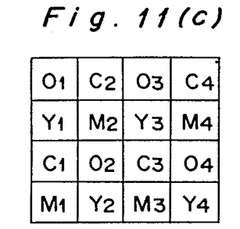

FIGS. 11(a), 11(b) and 11(c) which are directed to a third embodiment of the invention tables with "m" rows and "n" columns specialized for black color information by way of examples, where m=4 and n=4.

In the color matrix table of FIG. 11(a), the first row begins with O1, which is in the first column, and thereafter come Y2, O3 and Y4 in that order. The second row begins with C1, which is also in the first column, and thereafter come M2, C3 and M4 in that order. Similarly, the third row begins with Y1, and thereafter come O2, Y3 and O4. The fourth row begins with M1, and thereafter come C2, M3 and C4.

In this color matrix table, Yi (i=1-4) indicates double-output of yellow (Y) and black (Bk) inks, that is, a yellow (Y) ink dot and a black ink dot are put one upon another. Similarly, Mi (i=1-4) indicates double output of magenta (M) and black (Bk) inks. Ci (i=1-4) indicates double-output of cyan (C) and black (Bk) inks. Oi (i=1-4) indicates single-output of black ink, that is, only a black ink dot is formed and no other color ink is outputted on the black ink dot. "i" indicates a column number.

By the use of the color matrix tables of FIG. 11(a), 11(b) and 11(c) which all have Y, M and C dispersed uniformly, a printed image can obtain deep black without a hue of the color of yellow, magenta or cyan, or stripes.

In many of such systems as shown in FIG. 21, output image signal from the image processor 2 is composed of data of three primary colors of red (R), green (G) and blue (B). In this case, on one hand, black is expressed by R=G=B=0 according to the additive color mixture theory, and on the other hand, by R=G=B=1 according to the subtractive color mixture theory. And, when a full-colored image is printed using yellow, magenta, cyan and black inks in response to output signals indicative of the image from the image processor 2, color density of each of colors is expressed by the number of ink dots per unit area as a result of a dither processing, i.e., a processing using a dither matrix table, as aforementioned relative to the prior arts.

Density information of R, G and B of an input image is transformed into that of Y, M, C and Bk using the following equations (1) where set values of the dither matrix table of Bayer type of FIG. 22 are used as threshold values.

$$\left.\begin{array}{l} M = G < \text{(set value of the dither matrix)} \\ Y = B < \text{(set value of the dither matrix)} \\ C = R < \text{(set value of the dither matrix)} \end{array}\right\} \quad (1)$$

Y, M, C and Bk, information of two dimensions, are respectively derived from R, G and B, information of two dimensions, in the following manner by the above equations (1).

When color data of G is smaller than a set value of the dither matrix table, color information of M is given (M=1);

when color data of B is smaller than a set value of the dither matrix table, color information of Y is given (Y=1);

when color data of R is smaller than a set value of the dither matrix table, color information of C is given (C=1); and when all of M, Y and C are set to one (M=Y=C=1), color information of Bk is given.

Figure 12A:
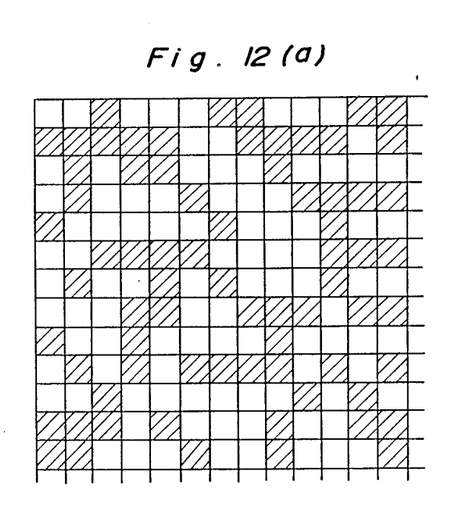
FIG. 12(a) shows an example of black dot arrangement.

When density information of each of R, G and B of the input image is processed using values of the dither matrix table of FIG. 22 as thresholds, a distribution of black ink dots as shown in FIG. 12(a) is obtained. In FIG. 12(a), hatched portions represent the black ink dots. As easily understood from the figure, probability that the black ink dots occur is high in the second, fourth, sixth, eighth and other like printing lines, in other words, in the (4n+2)nd and (4n+4)th lines of printing, where "n" is an integer. This is because the dither matrix table of Bayer type shown in FIG. 22 has elements of comparatively large values such as 12, 4, 14 and 6 in the second row, and 15, 7, 13 and 5 in the fourth row. That is, these second and fourth rows cause C, M and Y to be derived from R, G and B based on the equations (1) at high probabilities, respectively, and therefore the probability that black color information is generated is higher in those and their corresponding rows than that in the other rows.

Figure 12B:
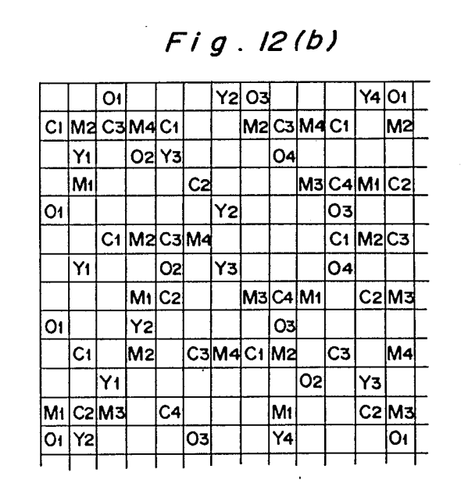
FIG. 12(b), shows a result of applying the color matrix table of FIG. 11(a) to the black ink dot pattern of FIG. 12(a)

When the color matrix table of FIG. 11(a), specialized for black color information, is applied to the black ink dot distribution of FIG. 12(a), double-output of black ink and another color ink is carried out at the hatched portions of FIG. 12(a), resulting in the double-output pattern as shown in FIG. 12(b). That is, in the first printing line of FIG. 12(a), only black ink (O1) is outputted first, and next, yellow ink (Y2) is outputted together with black ink, and then, only black ink (O3) is outputted again, and then yellow ink (Y4) is outputted together with black ink. After that, this series of ink output (O1-Y2-O3-Y4) is repeated till the end of the first line.

In the second printing line, cyan ink (C1) is outputted on a black ink dot first. C1, M2, Y3 and M4 are outputted on black ink dots in turn repeatedly.

In the third printing line, Y1-O2-Y3-O4 is repeated in turn.

In the fourth printing line, double-output of black ink and another color ink is carried out in the order of M1, C2, M3 and M1.

Printing of the (4n+1)st, (4n+2)nd, (4n+3)rd and (4n+4)th lines ("n" is an integer) is done in the same manner as that in the printing of the first, second, third and fourth lines, respectively.

As easily understood from the above description, the black ink dots are often located scatteringly due to the processing by the dither matrix table. In addition, in the even that input signals indicate picture images, the occurrence probability of black dots obtained based on the equations (1) gets higher as density level in the R-G-B system gets lower. Contrarily, the occurrence probability gets lower as the density level in the R-G-B system gets higher.

When the dither matrix table of FIG. 22 is used, the black ink dots occur at a high probability in the (4n+2)nd and (4n+4)th printing lines or rows, and accordingly, the color inks present in the second and fourth rows of the color matrix table of FIG. 11(a) are outputted on the black ink dots more than the color inks present in the other rows of the same color matrix table. In this case, the color inks used in the second and fourth rows are magenta and cyan inks and therefore, black of a printed image becomes bluish.

Similarly, when the color matrix table of FIG. 11(b) is used, a printed image becomes greenish because yellow and cyan inks (Bk+Y, Bk+C) are outputted much, compared with other combinations of color inks.

When the color matrix table of FIG. 11(c) is used, a printed image becomes reddish because magenta and yellow inks (Bk+M, Bk+Y) are outputted much, compared with other combinations of color inks.

As described above, the use of the color matrix tables shown in FIG. 11(a), 11(b) and 11(c) in combination with the dither matrix table shown in FIG. 22 gives a printed image a desired hue at a medium density level, because the large number of black ink dots appear in every two printing lines. On the other hand, where every printing line has almost the same number of black ink dots generated by the equations (1), that is, where black should be either deep or light, it does not occur that a specified combination of color inks is outputted much, compared with other combinations of color inks.

Even though black ink dots are distributed cyclically, no stripes of a certain hue show, because Y (yellow), M (magenta) and C (cyan) are arranged in the above color matrix tables in such a manner that only Y, for example, does not gather in one row or column, so that colors of outputted color inks are blended appropriately.

Figure 13:
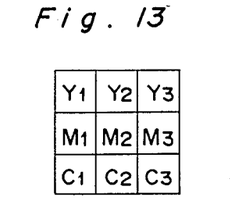
FIG. 13 shows a color matrix table where only yellow belongs to a first row, only magenta to a second row, and only cyan to a third row.
Figure 14:
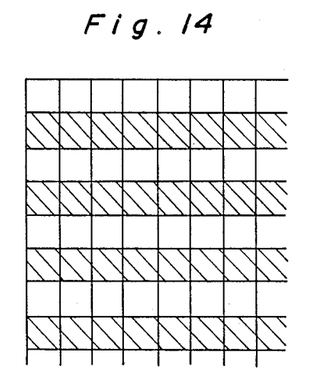
FIG. 14 shows a cyclic output of black ink dots.
Figure 15:
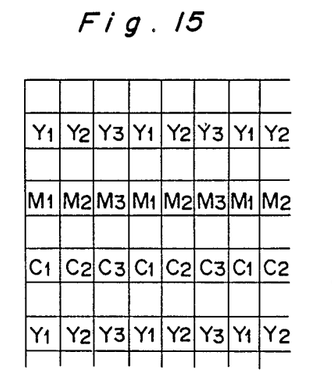
FIG. 15 shows a result of applying the color matrix table of FIG. 13 to the cyclic black ink dot pattern of FIG. 14.
Figure 16:
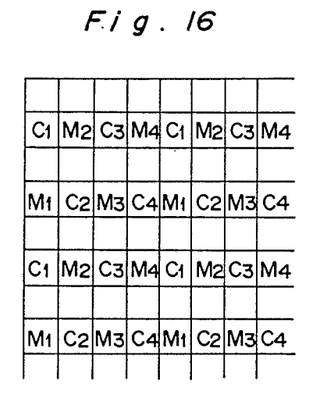
FIG. 16 shows a result of applying the color matrix table of FIG. 11(a) to the cyclic black ink dot pattern of FIG. 14.

When the distribution of the black ink dots is cyclic as shown in FIG. 14, and a color matrix table specialized for black color information is defined as shown in FIG. 13, a result of double-output of black ink and the other color inks is such a pattern as shown in FIG. 15. In this case, a line has only yellow ink, another line has only magenta ink, and still another line has only cyan ink, so that stripes having a hue of yellow, magenta or cyan show in a black area of a printed image, deteriorating quality of the image. On the other hand, with the color matrix table of FIG. 11(a), a non-cyclic double-output pattern as shown in FIG. 16 is obtained. Due to this pattern, a printed image is of a good quality and black of the image appear bluish to humans' eyes.

FIGS. 17(a), 17(b), 17(c) and 17(d) which are directed to a fourth embodiment of the invention show m-n color matrix tables with "m" rows and "n" columns specialized for black color information by way of examples, where m=4 and n=4. These color matrix tables have elements fixed relative to printing paper, in other words, each element of the matrices is assigned to a given portion of the printing paper, so that the matrix elements have one-to-one correspondence to all dots to be made on the printing paper. In the following description, Yi (i=0-15) indicates double-output of black and yellow inks, Mi (i=0-15) indicates double-output of black and magenta inks, and Ci (i=1-15) indicates double-output of black and cyan inks. Oi (i=1-15) indicates that a dot of only black ink is formed. "i" indicates a set value of the dither matrix table of FIG. 22, i.e., a threshold used in the same equations (1) as described in the third embodiment, for transforming the R-G-B system into the Y-M-C system.

Figure 17A:
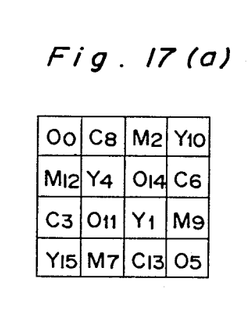
FIGS. 17(a), 17(b), 17(c) and 17(d) each shows a color matrix table used in a fourth embodiment of the present invention.

In the color matrix table of FIG. 17(a), the first row begins with 00, which is in the first column, and thereafter come C8, M2 and Y10 in that order.

The second row begins with M12, which is in the first column, and thereafter come Y4, O14 and C6 in that order.

The third row begins with C3, which is in the first column, and thereafter come O11, Y1 and M9 in that order.

The fourth row begins with Y15 in the first column, and thereafter come M7, C13 and O5 in that order.

In all the color matrix tables of FIGS. 17(a), 17(b) 17(c) and 17(d), "Y", "M" and "C" are distributed uniformly, so that a printed image can have an even deep black without stripes or any specific hue of yellow, magenta or cyan.

As described in above in the third embodiment of the invention in many of such systems as shown in FIG. 21, output image signal from the image processor 2 is composed of data of three primary colors of red (R), green (G) and blue (B). In this case, on one hand, black is expressed by R=G=B=0 according to the additive color mixture theory, and on the other hand, by R=G=B=1 according to the subtractive color mixture theory. And, when a full-colored image is printed using yellow, magenta, cyan and black inks in response to output signals indicative of the image from the image processor 2, color density of each of colors is expressed by the number of ink dots per unit area as a result of a dither processing, i.e., a processing using a dither matrix table, as aforementioned relative to the prior arts.

Density information of R, G and B of an input image is transformed into that of Y, M, C and Bk in the same way as in the third embodiment, using the aforementioned equations (1) where set values of the dither matrix table of Bayer type of FIG. 22 are used as threshold values.

Figure 18A:
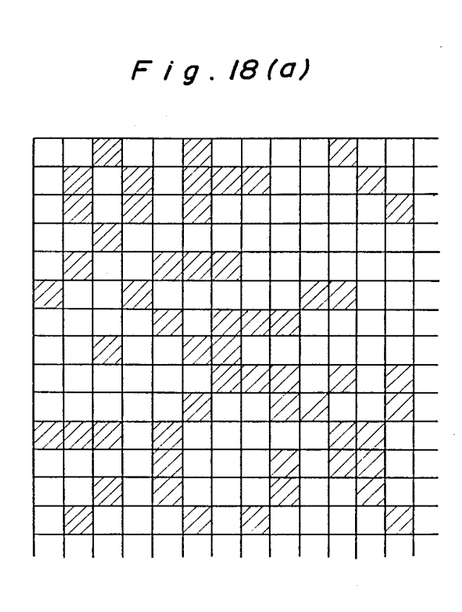
FIG. 18(a) shows an example of black dot arrangement.

When density information of each of R, G and B of an input image is processed using values of the dither matrix table of FIG. 22 as thresholds, a distribution of black ink dots as shown in FIG. 18(a) is obtained. In FIG. 18(a), hatched portions represent portions where black ink is outputted.

Figure 18B:
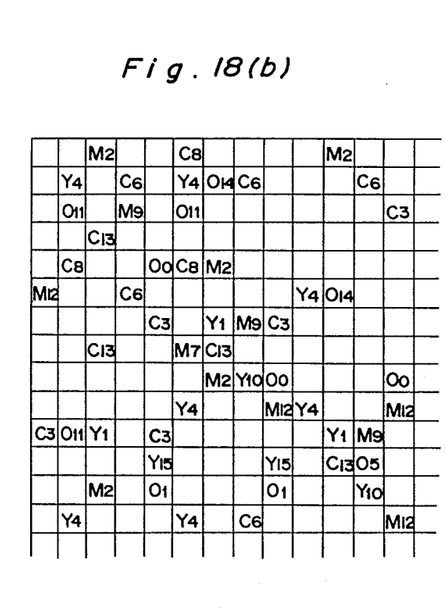
FIG. 18(b) shows a result of applying the color matrix table of FIG. 17(a) to the black ink dot pattern of FIG. 18(a)

When the color matrix table of FIG. 17(a) specialized for black color information is applied to the black ink dot distribution of FIG. 18(a), double-output of black ink and another color ink is carried out at the hatched portions of FIG. 18(a) in the image printing, resulting in a double-output pattern as shown in FIG. 18(b). That is, in the first printing line of FIG. 18(b), magenta ink (M2) is outputted for double-output on a black ink dot portion which is in the third column, first, and then cyan ink (C8) is outputted on a next black ink dot which belongs to the sixth column, and on the third black ink dot in the eleventh column is outputted magenta ink (M2) again. The reason for such color ink output is that each element of the color matrix table of FIG. 17(a) is allotted fixedly to each of dot portions of printing paper, in other words, the matrix elements have one-to-one correspondence to the dot portions of the printing paper. Here, the dot portion means a portion which is allotted to a ink dot which is formed through a single-output or double-output of inks.

In the second printing line, Y4, which is in the second column of the color matrix table of FIG. 17(a), is outputted for the dOuble-output with black ink, first. Next, C6 which is in the fourth column of the same color matrix table is outputted on a black ink dot which is in the fourth dot portion in FIG. 18(a). Thereafter, Y4 is outputted again because the present dot portion is the sixth (4+2) dot portion in FIG. 18(a). Next, O14, that is, only black ink is outputted.

In the third printing line, single-output of black ink (O11) is carried out first. After O11 come M9, O11, C3 in that order.

In the fourth printing line, double-output of cyan ink (C13) and black ink is carried out in the third column of the pattern.

Printing of the (4n+1)st, (4n+2)nd, (4n+3)rd and (4n+4)th lines (n=1,2,3, . . . ) is done using the first, second, third and fourth rows of the color matrix table, respectively.

Figure 19:
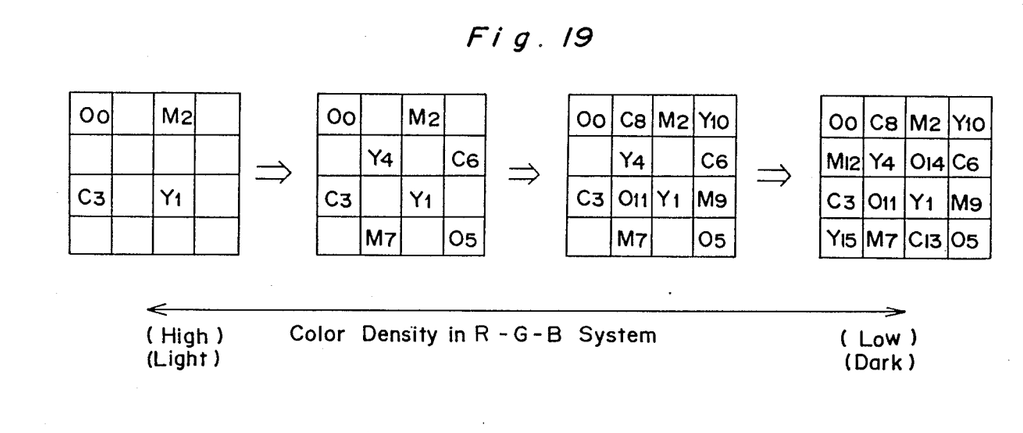
FIG. 19 shows a change in the number of black ink dots in proportion to color density level in R-G-B System, wherein the number of black ink dots increases as the color gets darker.

As easily understood from the above description, the black ink dots are often located scatteringly due to the processing by the dither matrix table. In addition, in the event that input signals indicate picture images, occurrence probability of the black ink dot formation which is given by the equations (1) using the dither matrix table of FIG. 22 gets higher as density level in the R-G-B system gets lower, as shown in FIG. 19. Contrarily, the occurrence probability gets lower as the density level in the R-G-B system gets higher. And, in any case, ink output of "black-yellow", "black-magenta", "black-cyan" and "black only" is carried out at an equal probability when the color matrix tables of FIG. 17 are applied, as understood from FIG. 19, so that black printed does not have a hue of a specified color at any density level in the R-G-B system.

Even in a case that the black ink dots are distributed cyclically, no stripes show, because Y (yellow), M (magenta) and C (cyan) are arranged scatteringly in both the rows and columns in the above color matrix tables, so that colors of outputted color inks are blended appropriately.

Figure 20:
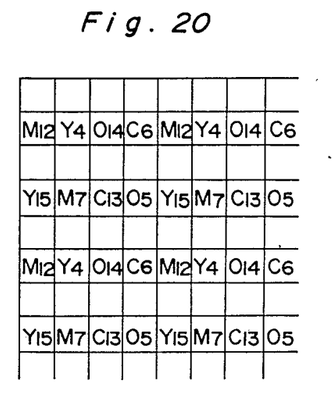
FIG. 20 shows a result of applying the color matrix table of FIG. 17(a) to the cyclic black ink dot pattern of FIG. 14.

If the distribution of the black ink dots is cyclic as shown in FIG. 13, and a color matrix table specialized for black color information is defined as shown in FIG. 14, double-output of black ink and another color ink results in such a pattern as shown in FIG. 15, as mentioned above referring to the third embodiment. In this case, stripes having a hue of yellow, magenta or cyan show in a black area of a printed image, deteriorating quality of the image. On the other hand, with the color matrix table of FIG. 17(a), a non-cyclic double-output pattern as shown in FIG. 20 is obtained. Due to this pattern, a printed image is of a good quality, and black of the image becomes deep.

Figure 17B:
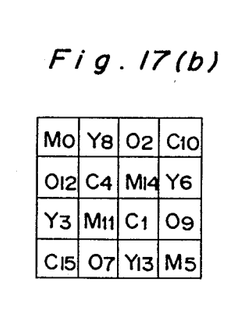
Figure 17C:
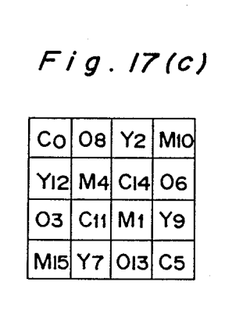
Figure 17D:
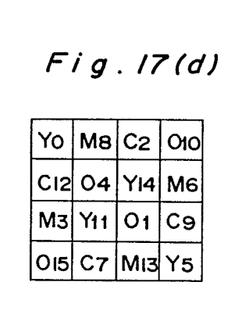

This invention is applied to processing of color information stored in a memory. Therefore, color matrix tables made by only replacing Y, M, C and O of FIG. 17(a), as shown in FIG. 17(b), 17(c) and 17(d), for example, and further color matrix tables which have table information on Y, M, C and O obtained by changing set values of the dither matrix table are included within the scope of the invention.

The invention being thus described, it will be obvious that the same may be varied in many ways. Such variation are not to be regarded as a departure from the spirit and scope of the invention, and all such modifications as would be obvious to one skilled in the art are intended to be included within the scope of the following claims.

What is claimed is:

1. A method for printing a colored image, on a medium using black ink and a plurality of inks of other colors comprising the steps of:
  (a) placing said black ink in the form of dots on the medium so as to produce a black area of the image;
  (b) allotting said plurality of other inks; and
  (c) placing said plurality of other inks on only at least part of the black ink dots in accordance with the allotment so that said other inks which are on said black ink dots are placed in the form of dots which are superimposed on each other the black ink dots.

2. The method for printing as claimed in claim 1, wherein allotment and placing of each of the other color inks onto the black ink dots is determined by a color matrix table defining a rule of color ink allotment.

3. The color printing method as claimed in claim 2, wherein the color matrix table defines the allotment of the other color inks so that the respective color inks occur at similar probabilities in the black area.

4. The method for printing as claimed in claim 3, wherein the color matrix table contains matrix elements for not placing any of the color inks.

5. The method for printing as claimed in claim 4, wherein the black ink is placed in accordance with a dither matrix table defining output of the black ink to make the black ink dots.

6. The method for printing as claimed in claim 5, wherein the dither matrix table is composed of an array of thresholds for defining where to form the black ink dots in the black area of the colored image dependent on color density levels of colors in the colored image so that double output of the black ink and the other color inks determined by the color matrix is carried out in accordance with the color density levels of the colors in the colored image.

7. The method for printing as claimed in claim 6, wherein the color matrix table defines the placement of the other color inks to the black ink dots in such a manner that, of the other color inks, a specified color ink is allotted more than the other color inks to a portion of the black area where the black ink dots occur at a high occurrence probability according to the dither matrix table, whereby the specified color ink is placed more than the other color inks in the black area of the colored image.

8. The method of printing as claimed in claim 5, wherein the color matrix table defines the rule of color ink placement in such a manner that matrix elements of the color matrix table have one-to-one correspondence to all dots to be made on a printing paper.

9. The method of printing as claimed in claim 8, wherein the dither matrix table is composed of an array of thresholds for defining where to form the black ink dots in the black area of the colored image dependent on color density levels of colors in the colored image so that double output of the black ink and the color inks determined by the color matrix is carried out in accordance with the color density levels of the colors in the colored image.

10. The method for printing as claimed in claim 1, wherein allotment and placing of each of the other color inks onto the black ink dots is determined based on a random selection of said other color inks.

11. The method for printing as claimed in claim 1, wherein the other color inks are yellow, magenta and cyan inks.

* * * * *